United States Patent [19]

Chapin

[11] Patent Number: 4,938,430
[45] Date of Patent: Jul. 3, 1990

[54] TAPE MEASURE LOCK

[75] Inventor: David S. Chapin, Raleigh, N.C.

[73] Assignee: Cooper Industries, Inc., Houston, Tex.

[21] Appl. No.: 236,005

[22] Filed: Aug. 24, 1988

[51] Int. Cl.$^5$ ............................................. B65H 75/48
[52] U.S. Cl. .................................. 242/107.2; 242/84.8; 33/797
[58] Field of Search ............................. 242/107.2, 84.8; 33/797

[56] References Cited

U.S. PATENT DOCUMENTS

| | | | |
|---|---|---|---|
| 3,415,461 | 12/1968 | Zelnick | 242/84.8 |
| 3,578,259 | 5/1971 | Zelnick | 242/107.2 |
| 4,131,244 | 12/1978 | Quenot | 242/107.2 |
| 4,194,703 | 3/1980 | Roe | 242/107.2 |
| 4,293,058 | 10/1981 | Burton | 242/84.8 X |
| 4,479,617 | 10/1984 | Edwards | 242/107 |
| 4,527,334 | 7/1985 | Jones et al. | 33/138 |

Primary Examiner—John M. Jillions
Attorney, Agent, or Firm—David A. Rose; Donald J. Verplancken; Ned L. Conley

[57] ABSTRACT

The tape measure includes a lock for locking the tape in an extended position from its case. The lock includes a toggle pivotably mounted on the case and a lock shoe extending from one end of the toggle to a position adjacent the tape. When the toggle is depressed, the lock shoe is forced against the tape so as to wedge the tape between the lock shoe and the case to prevent its retraction. The lock shoe includes a series of opposed recesses to permit the lock shoe to compress in length upon engagement with the tape. The lock shoe also includes a bend which translates the diagonal movement of the toggle into a vertical movement of the lock shoe.

11 Claims, 4 Drawing Sheets

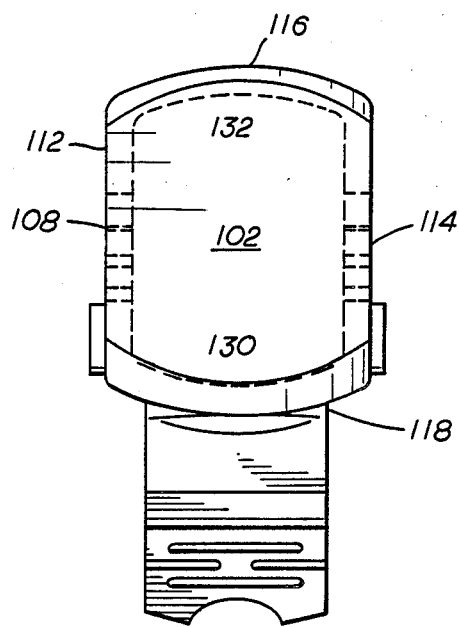
FIG. 5
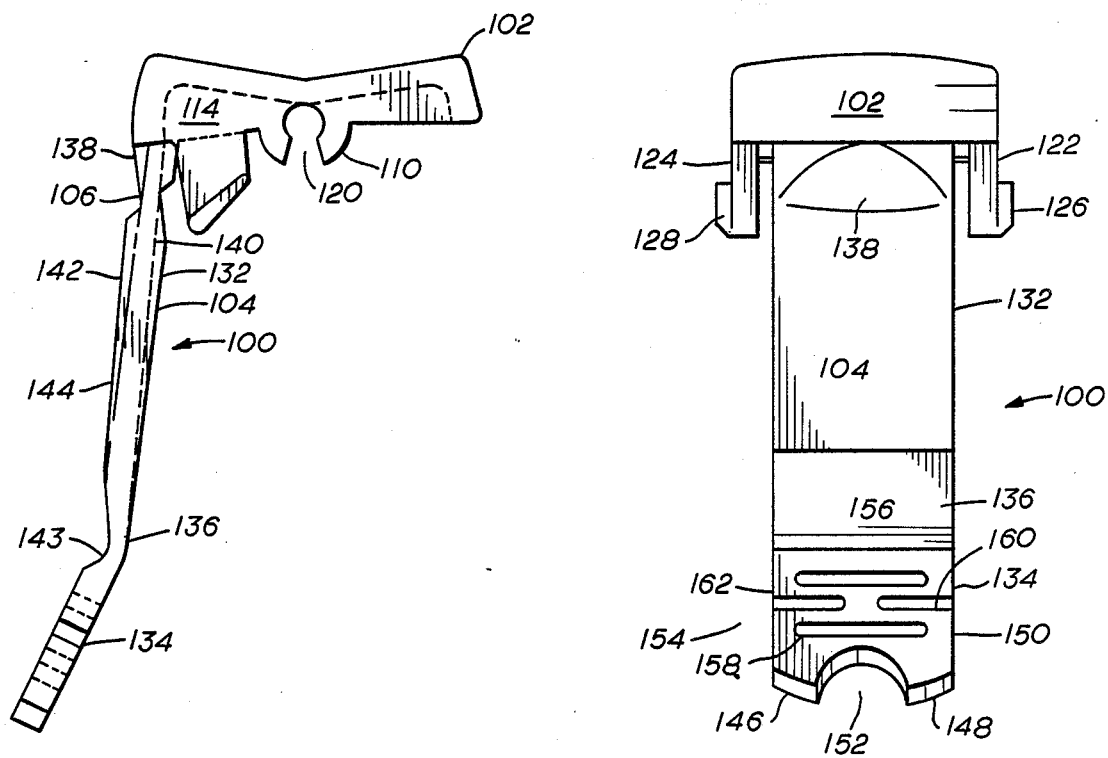
FIG. 6
FIG. 7

4,938,430

TAPE MEASURE LOCK

BACKGROUND OF THE INVENTION

The present invention relates to the field of tape measures and more particularly to locks used to prevent retraction of the retractable tapes used in tape measures.

A tape measure typically includes a case, a metal tape retractably mounted within the case, a retraction means for retracting the tape, a stop for preventing the end of the tape from retracting into the case, a clip to attach the tape measure to clothing, such as a belt, and a lock which releasably secures the tape in an extended position. A common prior art lock includes a toggle switch and a lock shoe attached to the toggle switch, such that when one end of the toggle is depressed, the lock shoe is moved downwardly against the tape which is in turn forced against the inside bottom of the case. Pushing the other end of the toggle releases the lock shoe, allowing the tape to freely retract into the case.

Prior art tape measures employ lock shoes in several configurations. In one such configuration, the lock shoe is a substantially straight finger, which is connected to the toggle by a radial arm. The finger, or lock shoe, is held between the side of the case, which is angled inward, and the side of the tape rolled within the case. When the toggle is depressed, it swings the end of the shoe connected to the radial arm inward with respect to the side of the case, and the opposite end of the shoe is swung outward with respect to the case. Because the ends of the shoe, which is a constant length, swing through an arc, the ends travel laterally with respect to the case bottom. Thus, as the toggle is pushed into the case, the shoe tends to depress the tape against the inner case bottom, eventually wedging the tape with sufficient force to overcome the spring force tending to retract the tape into the case, thereby locking the tape in place.

In U.S. Pat. No. 4,527,334, Jul. 9, 1985, Jones, et al., another lock system is disclosed, wherein the tape is attached to a circular housing, and the circular housing is in turn releasably engageable with the lock. In this configuration, the lock has an arm which releasably engages the circular housing on the perimeter of the housing. The lock incorporates a metal coiled spring to assist in biasing the lock against the housing to maintain engagement contact.

U.S. Pat. No. 4,479,617, Oct. 30, 1984, Edwards, discloses a lock wherein a reciprocating locking plate has cams which are actuated by the toggle. The toggle has a swing type radial arm which engages the cam, and the toggle motion of engaging and disengaging the toggle causes lateral motion in the locking plate. The locking plate, in turn, pinches the tape against the case bottom to lock the tape in position. A similar lock system is disclosed in U.S. Pat. No. 3,578,259, Oct. 11, 1971, Zelnick, et al.

One deficiency of the existing swing lock is that the vertical travel, i.e., the distance the shoe will travel to interferingly lock the tape in place, is limited by the arc through which the shoe end may swing. To accommodate greater arc, and thereby greater vertical travel, the case must be enlarged to permit a longer radial arm. A longer radial arm yields a longer arc, and therefore greater vertical travel. However, tape size is an important cost and utility factor, and thus a larger case increases cost and decreases utility.

Another deficiency of the prior art lock shoes is lock shoe wear. As the tape is pulled past the engaged lock shoe, the end of the lock shoe tends to wear. Likewise, the material of the shoe begins to take on a permanent deformation, i.e., a set, after repeated use. Both of these conditions tend to reduce the effectiveness of the lock shoe over time.

The present invention overcomes these deficiencies of the prior art.

SUMMARY OF THE INVENTION

The present invention includes a toggle, pivotably mounted on the case, with an integrally molded lock shoe extending from one end of the toggle into the case with its free end positioned adjacent the tape. The lock shoe includes a series of partial, staggered horizontal cutouts to permit the lock shoe to be compressed upon engagement of the toggle in the locking position. As the end of the lock shoe bears against the tape, the lock shoe is compressed in length. A guide integral with the case is also provided to guide the lock shoe within the case. The lock shoe of the present invention provides a greater vertical travel than the prior art swing type lock shoes, and contains an integral wear compensation system. Further, the lock shoe may be used within the same dimensional envelope as the prior art lock shoe, while giving greater vertical travel.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 5 is a top view of an alternative embodiment of the lock shoe of the present invention;

FIG. 6 is a side view of the lock shoe of FIG. 5;

FIG. 7 is a front view of the lock shoe of FIG. 5; and

DESCRIPTION OF THE PREFERRED EMBODIMENT

Figure 1:
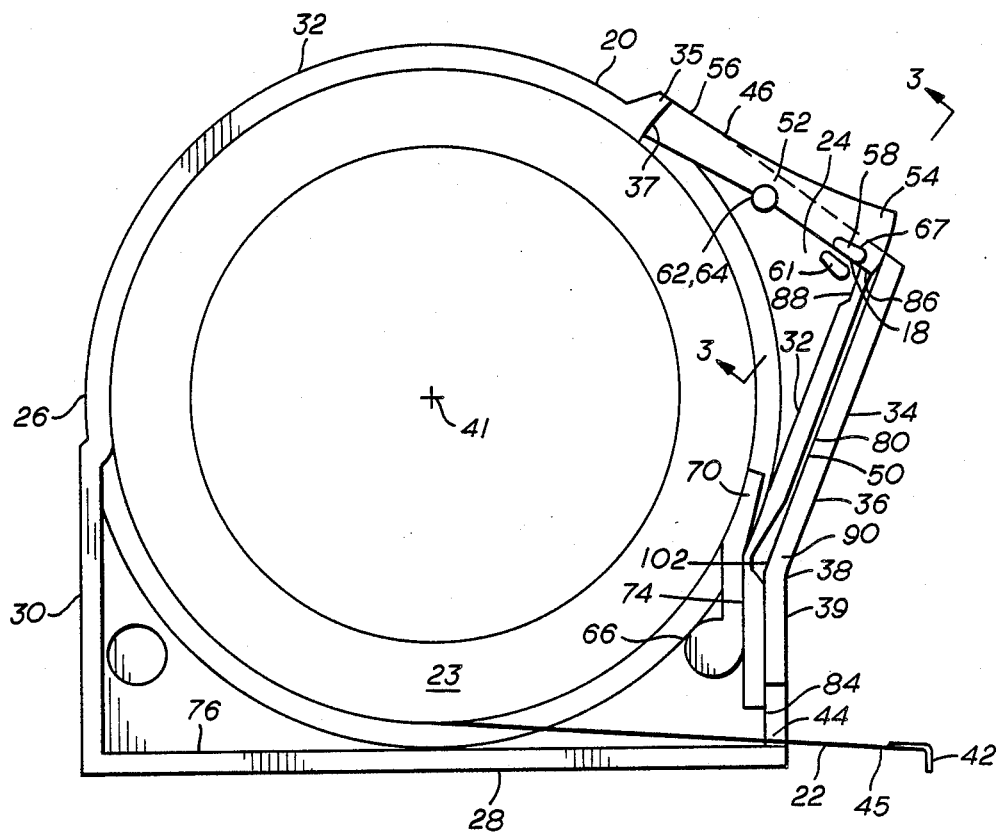
FIG. 1 is a partial cross-sectional view of a tape measure having the lock of the present invention in the disengaged position.

Referring initially to FIG. 1, the tape measure of the present invention includes a case 20, a tape blade 22, a tape retraction means 23, and a lock 24. The tape retraction means 23 is constructed to retract the tape blade 22 into case 20 for convenient storage. Most tape measures use a spring retraction system, as the tape retraction means 23, to retract the tape. U.S. Pat. Nos. 3,578,259; 4,479,617; and 4,527,334 generally describe such a retraction system. However, the present invention may be employed with other retraction systems. The tape retraction means 23 applies a retracting force whenever the tape 22 is pulled out of the case 20. To prevent the tape 22 from retracting during use, a lock means is required to overcome the retracting force of the tape retraction means 23 such that the extended portion of the tape 22 pulled from the case 20 will be locked in place so that the user will not have to hold the tape in an extended position. This frees the user while taking measurements. The lock 24 of the invention is disposed within the case 20 to selectively prevent tape retraction.

Figure 3:
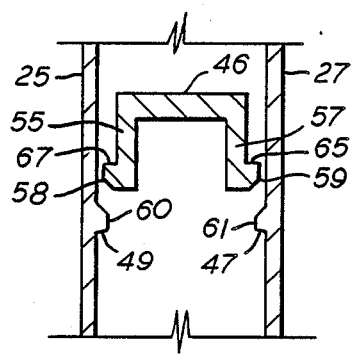
FIG. 3 is a cross-sectional view of the toggle engagement system of the lock of FIG. 1.
Figure 8:
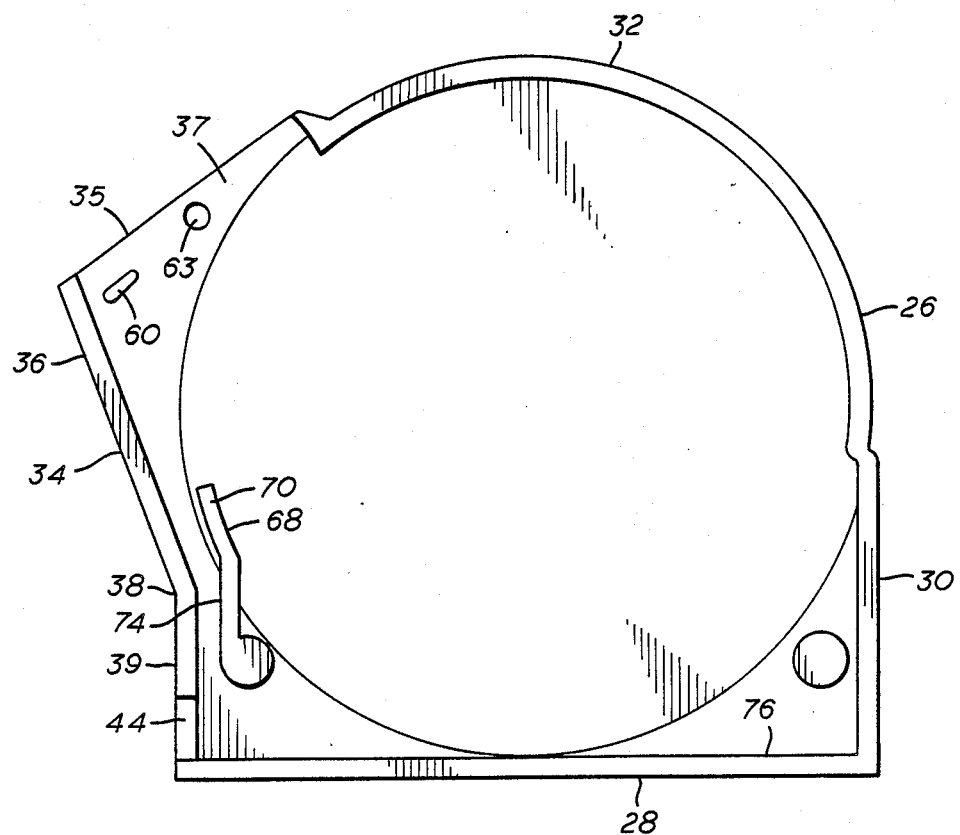
FIG. 8 is a partial cross-sectional view of a side of the tape measure case.

The case 20 of the present invention is configured and dimensioned to house the tape retraction means 23, the coiled tape blade 22, and the lock 24. Thus, the case 20 includes generally flat sides 25, 27 as shown in FIG. 3 and a configured peripheral edge 26 as shown in FIGS. 1 and 8. Peripheral edge 26 has a flat bottom 28 and an upwardly projecting flat backside 30 which extends further upwardly in an arcuate portion 32 which also forms the top peripheral edge of the case 20. The arcuate portion 32 terminates in an angled frontal portion 34 adjacent to which is housed the lock 24. The angled frontal portion 34 includes an upwardly facing flat portion 35 having an aperture 37 for housing toggle 46 as hereinafter described. Angled frontal portion 34 also includes a medial flat portion 36 extending from the upper flat portion 35 to a lower straight portion 39 which has a tape slot 44 through which tape blade 22 extends. The medial portion 36 and lower straight portion 39 of frontal portion 34 of peripheral edge 26 meet at the fulcrum 38 for the lock 24 hereinafter described in further detail.

The tape retraction means 23 (not shown in detail) may be one of several designs well known in the art. Typically the interior end of the tape blade 22 is attached to one end of a spring coiled about the center 41 of the case 20. As the tape blade 22 is withdrawn through tape slot 44, the spring is coiled tightly whereby upon the release of the tape, the coil expands to retract the tape blade 22 back into the case 20.

The tape blade 22 includes a stop 42. The stop 42 is a generally right angled piece of metal preferably riveted to the end of the tape blade 22. The tape slot 44, located in the lower straight portion 39 at the juncture of the angled frontal portion 34 and the flat bottom side 28, is dimensioned in cross section to receive the tape blade 22, but small enough to prevent the metal stop 42 from passing therethrough thereby preventing the complete retraction of the tape blade 22 into the case 20. As the tape retraction means 23 retracts the tape blade 22 into the case 20, the stop 42 engages the peripheral edge 26 of the case 20 around the tape slot 44 to prevent the end 45 of the tape blade 22 from completely withdrawing into the case 20 through slot 44.

Figure 2:
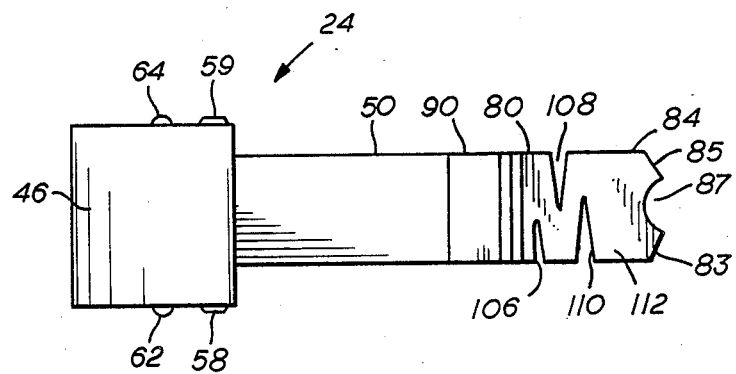
FIG. 2 is a front view of the lock shoe of the lock of FIG. 1.

Referring now to FIGS. 1–3, FIG. 2 illustrates the lock 24 which includes a toggle 46 molded to a lock shoe 50. Lock 24 is made of plastic and is preferably molded in one piece. The toggle 46 is generally rectangular, although ovoid or other shapes may be used, and is dimensioned to be received within the aperture 37 of the case 20. Toggle 46 includes upper and lower arcuate surfaces forming enlarged ends about a narrow midportion forming the pivot 52 for the toggle 46. The enlarged end portions form an on-flat 54 and an off-flat 56 to toggle the lock 24 on and off. The thickness of on and off flats 54, 56 are dimensioned to be received within case aperture 37 whereby upon depression of one of the flats 54, 56 of the toggle 46, the surface of the flat is substantially flush with the surface of the peripheral edge 26. The opposite flat then protrudes out of the case for subsequent engagement. The toggle 46 further includes cylindrical projections 62, 64 projecting from each side of the toggle 46 adjacent the pivot 52. The projections 62, 64 are received within opposed cylindrical recesses 63 (only one shown) in the sides 25, 27, respectively, of the case 20. The projections 62, 64 rotate within such cylindrical recesses to permit the toggle 46 to rotate or pivot about the pivot point 52.

Figure 4:
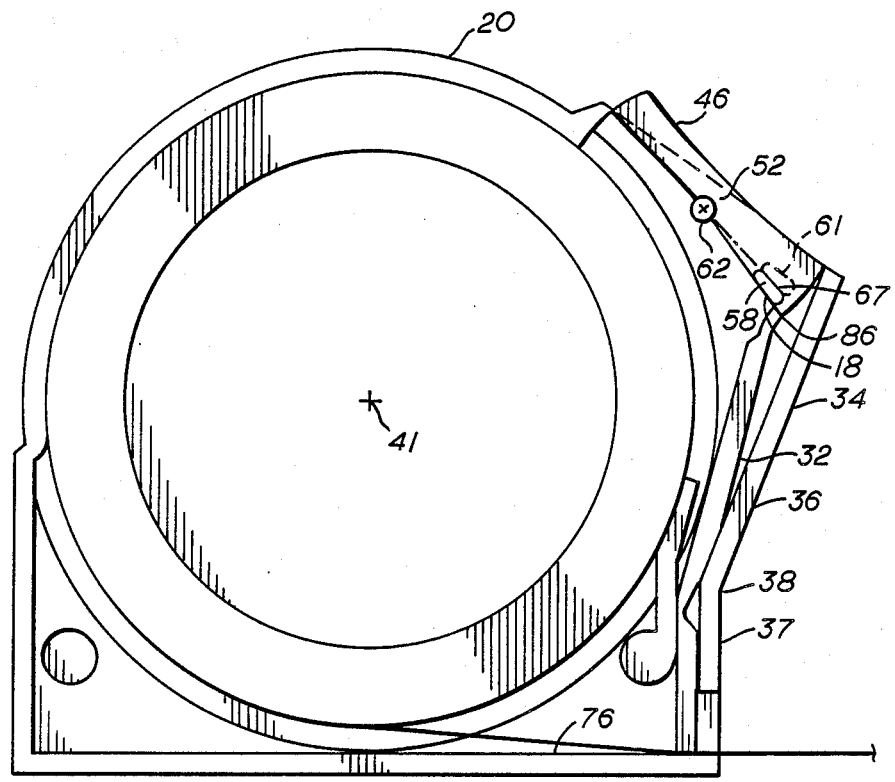
FIG. 4 is a partial cross-sectional view of the lock of FIG. 1 in the engaged position.

As is best shown in FIGS. 3 and 4, the cross section of the toggle 46 is generally U-shaped having downwardly projecting sides 55, 57. The free edge of the sides 55, 57 adjacent the on flat 54 includes generally wedge-shaped protrusions 58, 59 for engagement with case projections 60, 61 projecting inwardly from the sides 25, 27 of the case 20. Protrusion top 18 and shoulders 65, 67 are disposed co-linear with radii extending from the center of pivot 52. Toggle protrusions 58, 59 are dimensioned and located to interferingly engage case protrusions 60, 61 as the on-flat 54 of toggle 46 is depressed. Upon the depression of on-flat 54, toggle protrusions 58, 59 engage case protrusions 60, 61 and cam inwardly to interferingly pass over case protrusions 60, 61. The upper surface or shoulders 65, 67 of toggle projections 58, 59 project normally from the side walls of toggle 46 and engage the lower shoulders 47, 49 of case protrusions 60, 61 to lock the on-flat 54 in the depressed and locked position. Lower shoulders 47, 49 project from walls 25, 27 at an obtuse angle, preferably 110°. Upon depressing the off-flat 56, the toggle projections 58, 59 again interferingly pass over and between the case protrusions 60, 61 to disengage the lock 24.

The lock shoe 50 of lock 24 is a rectangular strip of plastic extending from the underneath side of toggle 46 at the on-flat 54. The lock shoe 50 extends downwardly in case 20 adjacent the inner surface of the angled frontal portion 34 of the case 20. The end 86 of lock shoe 50 attached to the toggle 46 includes spring recess 88 which creates a hinge which bends as the lock shoe 50 reciprocates within the case 20.

The lock shoe 50 is configured to extend from the toggle 46 downwardly into the case 20 adjacent the frontal portion 34, such that the bearing end 84 of the lock shoe 50 is disposed above and adjacent the tape blade 22 at the tape slot 44. Bearing end 84 includes engagement tangs 83, 85 and cutout 87. The lock shoe 50 includes a transverse groove 90 located adjacent the fulcrum 38 of frontal portion 34. The groove 90 permits the lock shoe 50 to follow the contour of frontal portion 34 and bend downwardly at fulcrum 38. The engagement tangs 83, 85 on bearing portion 80 of the lock shoe 50 extending below the groove 90 engage the upper surface of the tape blade 22 upon depression of the on flat 54 of the toggle 46. Cutout 87 is located between engagement tangs 83, 85 to allow stop 42 to retract into case 20 adjacent lock shoe 50. The bearing portion 80 includes a series of opposed and staggered triangular-shaped cutouts 106, 108, 110 permitting portion 80 to contract upon bearing engagement with tape blade 22. Although three triangular cutouts are shown and described, other arrangements of cutouts may be employed without deviating from the scope of the invention. The length of the lock shoe 50 is dimensioned such that upon bearing engagement of the bearing end 84 against the tape blade 22, the spring and bearing portion 80 is further compressed since the toggle 46 includes further travel after bearing engagement with tape blade 22. As bearing end 84 becomes worn or takes on a permanent set from continued use over time, the spring and bearing portion 80 provides continued pressure and lateral movement against the tape blade 22 to compensate for such wear or permanent set. Further, as the lock shoe 50 bears upon the tape blade 22, end 86 adjacent toggle 46 is compressed and buckles, creating additional loading force on the tape blade 22.

As best shown in FIGS. 1 and 8, guides 66, 68 are provided in case halves 25, 27 between the tape retraction means 23 and the lock shoe 50. Guides 66, 68 are further located on the case sides 25, 27 such that the tape blade 22 passes between the guides 66, 68 and the inner surface 76 of the bottom side 28 of the case 20. The guides 66, 68 are so disposed within the case 20 as to form a guide slot between themselves and the inside of the angled frontal portion 34 when case halves 25, 27 are connected. Each guide 66, 68 includes an arcuate surface 70 adjacent the outer side of the coil of the tape 22. The opposite side 74 of guides 66, 68 includes a bend that conforms to the bend 90 of the lock shoe 50.

Referring generally to FIGS. 5 through 7, an alternative embodiment of the invention is shown. Lock 100 includes ovoid toggle 102 and configured lock shoe 104 interconnected at lock hinge 106. Toggle 102 has opposed snap pin retainers 108, 110, which fit over pins (not shown) projecting from case sides 25, 27. Lock 100 is sized to fit into aperture 37 after tape 22 is assembled into case 20. Thus, lock 100 may be removed and replaced without disassembly of case 20 at various stages of the manufacturing process, or replaced by the user without disassembly of the case 20.

Referring again to FIGS. 5 and 7, toggle 102 is an ovoid shape having generally parallel flat sides 112, 114 and rounded ends 116, 118. Where toggle 102 is used, aperture 37 is modified to match the contour of toggle 102. Toggle 102 further includes snap pin retainers 108, 110 which are located substantially equidistant rounded ends 116, 118 and form a pivot for the toggle 102. Snap pin retainers 110, 112 fit over opposed pins (not shown) projecting from case halves 25, 27 in the center of aperture 37. Snap pin recesses 108, 110 are formed as round cut outs in a arc shaped projection below flat sides, 112, 114, and include guide cutouts 120 (only one shown) to help guide the toggle over the mounting pins. Flat sides 112, 114 further include downward projecting lock beams 122, 124 on which outwardly projecting wedge shaped protrusions 126, 128 are located. Lock beams 122, 124 are sized to permit protrusions 126, 128 to slide over case wall projections as shown in FIG. 3 to lock the toggle 102 in position to prevent retraction of tape 22 inward the case 20.

Toggle 102 further has on-flat 130 located adjacent lock beams 126, 128 and rounded edge 118 and off-flat 132 located adjacent rounded edge 116. When lock 100 is located in case 20, depressing on-flat 130 causes the lock shoe to engage tape 22 to prevent retraction of tape 22 into 20. If on-flat 130 is depressed so that protrusions 126, 128 pass case projections and lock the toggle in position, off-flat 132 must be depressed to remove lock shoe 104 from the tape 22 to allow the tape 22 to retract into case 20.

Lock shoe 104 of lock 100 is a generally rectangular section of plastic molded directly to the underside of toggle 102 adjacent on-flat 130. Lock shoe 104 and toggle 102 are preferably one continuous molded piece of plastic. Lock shoe 104 has contoured upper section 132 and engagement section 134 interconnected by living hinge 136. Living hinge 136 permits engagement section 134 to pivot with respect to upper section 132 as toggle 102 is activated, thereby permitting the lock shoe 104 to follow the contour of frontal portion 34.

Lock shoe upper section 132 is an arcuate section, having arch shaped blend 138 blending from lock hinge 106 to toggle 102. Blend 138 meets rounded end 118 near its center and melds under toggle 102 to the perimeter of lock shoe 104. Concave recess wall 140 forms the backside of upper section 132, and convex protrusion wall 142 forms the front portion or upper section 132 which is located adjacent angled frontal portion 34. Concave recess wall 140 and convex protrusion wall 142 form the perimeter of the arcuate section, and blend into living hinge 136.

Living hinge 136 is formed by scoop cutout 143 located in the front wall 144 of lock shoe 104. Upon assembly of lock shoe 104 into case 20, living hinge is located adjacent and substantially between fulcrum 38 and guide 66, 68.

Engagement portion 134 has opposed engagement tangs 146, 148 located on lock shoe base 150 and separated by arc cutout 152. Arc cutout is sized to allow stop 42 to retract past lock shoe 104 when lock shoe 104 is located adjacent tape 22 but not engaged. Engagement tangs 146, 148 are contoured to match the inner surface of the bottom of case 20, to pinch and hold tape 22 in place therebetween. Engagement portion 134 further has compression recesses 154 located between engagement tangs 146, 148 and living hinge 136. Compression recesses 154 are comprised of horizontal slots 156, 158 and opposed recesses 160, 162 are located colinearly between slots 156, 158. Recesses and slots 156, 158, 160, 162 extend through engagement portion 134 and compress as lock shoe 104 engages tape 22 to maintain pressure on tape 22 to prevent tape 22 from retracting inward case.

While a preferred and alternative embodiment of the invention have been shown and described, modifications thereof can be made by one skilled in the art without deviating from the spirit of the invention.

I claim:

1. A lock for locking a tape extended from its housing within a case, comprising:
    a toggle pivotably mounted on the upper portion of the case;
    a member affixed to the toggle and extending into the case to a position adjacent the tape;
    the case including a lower wall portion extending substantially normal to the base of the case and a medial flat portion disposed between said lower wall portion and said toggle;
    said medial flat portion and said lower wall portion intersecting at an obtuse angle such that said medial flat portion extends outward from the case;
    said member having an articulation joint such that the portion of said member between said toggle and said joint actuates obtuse to said lower wall portion and the remaining portion below said joint actuates parallel to said lower wall when said toggle is depressed;
    said member further having compression means for compressing the length of said member upon pivoting the toggle to move said member against the tape.

2. The lock of claim 1, wherein said compression means includes a series of opposed recesses in said member.

3. The lock of claim 2, wherein said member includes a rectangular strip of plastic.

4. The lock of claim 1, wherein said member conforms to the configuration of the case.

5. The lock of claim 4 further including a guide disposed within the case for guiding said member into engagement with the tape.

6. The lock of claim 1, wherein said compression means includes a pair of elongated slots separated by opposed recesses in said member.

7. A tape measure, comprising:
- a case having a tape, means for retracting said tape into said case, and a lock for locking said tape into an extended position from said case;
- said tape adapted from one end extending outward from within said case and having a stop attached thereto to prevent retraction of said tape into said case;
- said lock including a toggle and a lock shoe attached to said toggle and extending into said case to a location adjacent the tape, said toggle being pivotably mounted within said case, such that depressing one end of said toggle moves said lock shoe against said tape and depressing the other end of said toggle moves said lock shoe away from said tape;
- a guide disposed within said case for guiding said lock shoe against said tape;
- said case having a slot therein through which said tape protrudes;
- said lock shoe having upper and lower portions, disposed about an articulating means, for permitting said lower end to arcuately articulate with respect to said upper portion, said articulating means disposed adjacent said guide; and
- said lock shoe further having a spring means for compressing said lock shoe upon engagement with said tape, whereby upon engagement of said one end of said toggle, said lock shoe is moved into engagement with the tape, pinching the tape against said case with a force sufficient to prevent said retraction means from retracting the tape into said case.

8. The tape measure of claim 7, wherein said lock means includes an elongated rectangular member molded to said toggle.

9. The tape measure of claim 7, wherein said member includes a series of partial horizontal cutouts.

10. The tape measure of claim 7 further including a flat on the base of said lock shoe for engaging said tape.

11. The tape measure of claim 7, wherein said member includes a pair of elongated slots separated by opposed horizontal partial cutouts.

* * * * *